July 12, 1960 R. E. JONES 2,944,846
CONTROLLED COLD FLOW PLASTIC BEARING FOR SWIVEL JOINTS
Filed Sept. 14, 1959
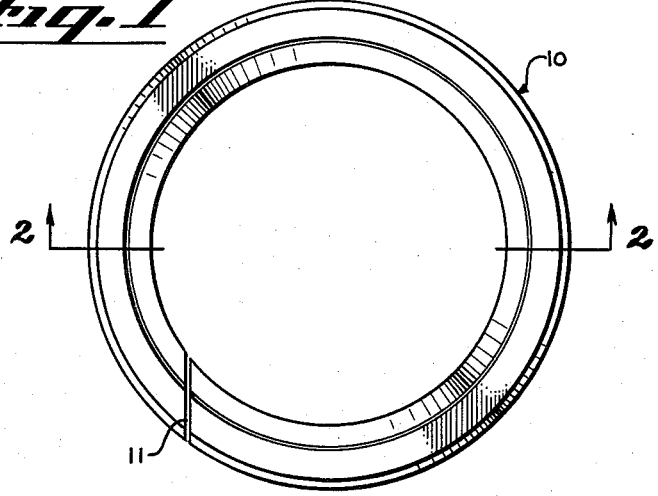
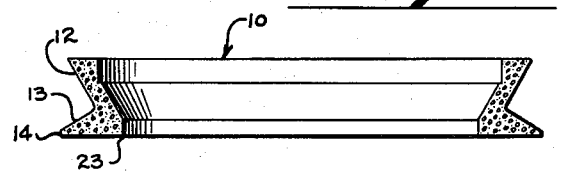
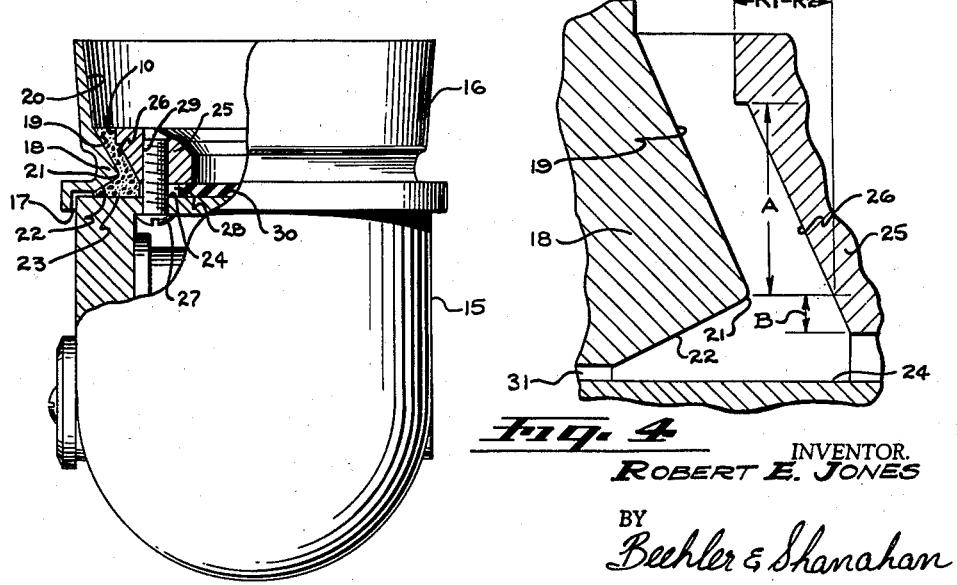
INVENTOR.
ROBERT E. JONES
BY
Beehler & Shanahan
ATTORNEYS

United States Patent Office 2,944,846
Patented July 12, 1960

2,944,846

CONTROLLED COLD FLOW PLASTIC BEARING FOR SWIVEL JOINTS

Robert Ellsworth Jones, West Covina, Calif., assignor to Sierra Engineering Co., a corporation of California Filed Sept. 14, 1959, Ser. No. 839,873

4 Claims. (Cl. 287—91)

This invention relates broadly to frictional bearings such as those used in prosthetic joints, and more particularly to a bearing in which a deformable bearing ring is compressed between parellel conical surfaces which converge toward a pressure plate over an axial length equal or substantially greater than the change in radii.

The invention has found its greatest utility in prosthetic joints, such as elbow, shoulder, knee, and wrist joints, but its unique features make it suitable for other applications where the same high standards of strength and rigidity are required in a bearing which is moveable but frictionally resists movement.

In the design of prosthetic limbs, conflicting requirements are encountered in the design of joints. Great strength and rigidity are required on the one hand, but on the other, the parts must be cushioned to avoid metal to metal contact. The joints must be moveable when a suitable pressure is applied, but must not move freely.

A typical prosthetic joint requires the coupling of an elbow joint housing to a tubular metal member corresponding to the upper arm. Most of the controlled movement will be of flexure of the lower arm around the elbow joint inside the elbow joint housing, but in addition, the elbow joint housing itself must be attached to the tubular upper arm in a manner permitting rotational adjustment about the axis of the upper arm.

A second factor which seriously complicates the design of the frictional bearing of the type herein discussed is that it is often desirable that the bearing be assembled or disassembled to the end of the tubular member without access to the interior of the tubular member from the sides or rear. The bearing should be such as to be insertable through the open end of the tubular member and then tightly attachable thereto so as to withstand undesired longitudinal withdrawal.

Previously known prosthetic joints have usually involved a number of parts which tended to work into loose assembly after a period of time. Others have had so much cushioning as to deprive the user of a sure sense of rigidity in the limb. Still others have failed to give the lasting and smooth frictional resistance to movement which is desired in such limbs. Others have not been adequately sealed and cushioned against sound or metal to metal contact, and still others have limited angular rotation about the axis of the upper arm due to necessary cable control within the tubular member and passing through the joint plane of rotation.

It is the major object of the present invention to provide a simple frictional bearing which will provide a cushioned bearing having rigidity, and suitable frictional resistance to rotation.

It is another important object of the invention to provide a cushioned frictional bearing which can be assembled into the open end of a tube and be adjusted for frictional resistance without access to the interior of the tube from the sides or one end.

It is an associated object of the invention to provide a frictional bearing which can be assembled or disassembled in the manner described, and which offers sufficient longitudinal cushioning without the introduction of undesired longitudinal play.

In summary, it is an object of the invention to provide a prosthetic joint meeting all the requirements described in the preceding paragraphs, without complicating construction or increasing the number of parts beyond a minimum.

The foregoing and other objects and advantages of the invention are achieved by means of a compressible bearing ring mounted between two conical compression surfaces.

As hereinafter described, the compressible bearing ring is of substantially uniform thickness over most of the area between the compression surfaces, but need not be exactly.

It has been found that the result of this construction is a better and stronger deformable bearing ring with a maximum of rigidity and shear strength in the assembly. The material which has been used in the embodiments of the invention constructed for use in prosthetic limbs has been nylon plastic, a tough but resiliently yielding cushioning material. When subjected to sufficient pressure by the two compressing surfaces employed in the bearing, it undergoes what is known in engineering as "cold flow" so as to distribute its surfaces in an almost viscous, liquid-like manner. Similarly, pressure is distributed throughout the deformable nylon ring, and over the surfaces of the compressing members. However, it will be understood that plastic or other cushioning materials having similar required characteristics may be used.

The invention will best be understood from the following description taken in connection with the accompanying drawings, in which:

Figure 1 is a plan view of a deformable bearing ring made according to the present invention;

Figure 2 is a sectional view of the deformable bearing ring of Figure 1 as seen in a plane passing through the axis thereof, as indicated by the arrows 2—2 in Figure 1;

Figure 3 is a side elevational view of a prosthetic limb joint, such as an elbow, partially broken away to reveal in section the other parts of the invention, in their assembly with the deformable bearing ring of Figures 1 and 2; and Figure 4 is a very much enlarged sectional view through the deformable bearing ring of Figures 1 and 2, and the adjacent compressing members, shown for the purpose of illustrating critical positional relationships.

In Figure 1, the deformable bearing ring, indicated generally by the numeral 10, is seen to be cut through to provide a separating opening 11, which lies in a chordal plane, i.e. a plane normal to the ring, but not passing through the axis thereof. Opening 11 makes it possible to deform the ring sufficiently to introduce it into a restricted tubular opening for assembly as will be described hereinafter in connection with Figure 3. At the same time, the chordal plane of opening 11 makes it possible to seal it tightly closed when compression is applied to the deformable ring 10.

The sectional view of Figure 2 reveals that the deformable bearing ring 10 is comprised of a generally conical upper part 12 and a lower flange member 13.

The conical portion 12 is of uniform wall thickness for most of its height, and varies only slightly from that uniform thickness at the upper end. A maximum bearing seating area is thus provided without departing from the optimum uniform thickness over most of the ring bearing area.

The flange member 13 diminishes in axial thickness with increasing diameter so that under compression conditions, it tends to flow outwardly into sealing contact. The outer circumference 14 of the flange 13 is sufficiently thick in an axial direction to provide the desired clearance between metal parts, but at the same time, the space thus provided is so small that undesirable flow of the plastic material in flange 13 cannot take place in a radial direction. The lower surface of the deformable ring is perpendicular to the axis of rotation which allows a broad surface contact with the plate which is, in turn, flat and perpendicular to the above-mentioned axis. The principles involved in this invention would not be violated if the plate was not flat but conical with the smaller diameter higher and the larger diameter lower.

In Figure 3, an elbow joint housing 15 is assembled to a tubular upper arm member 16 by means of a bearing constructed according to the invention. The tubular member 16 may be referred to as a tubular reception member, since the bearing parts are received into its open end through its end opening 17.

Just inside the end opening 17 it will be seen that the internal wall of the tubular reception member 16 is shaped to provide an internal annular shoulder 18.

The annular shoulder 18 has an inner conical wall surface 19, which converges from the internal tube diameter at 20 to a minimum opening diameter at 21. The shoulder 18 has an outer conical surface 22 which diverges from the minimum opening 21 to the end opening 17.

Inner conical surface 19 mates with the outer wall surface of the conical portion 12 of the deformable bearing member 10. Likewise, the outwardly diminishing flange 13 mates with the outer conical bearing surface 22.

The outer surface 23, in the embodiment illustrated, lies in a plane transverse to the axis of the tubular member 16 and the deformable bearing ring 10, but may be conical here also.

Surface 23 is engaged axially by the axial bearing surface 24 on the elbow housing 15. For purposes of generalization, the surface 24 may be referred to simply as an axial pressure plate or cone, although it will be understood that it need not be a plate in the strict sense of the word, but any structure which provides an axial bearing surface for seating against the outer surface 23 of the deformable bearing ring 10, whether it be flat or conical.

Inside of the deformable bearing ring 10, a relatively heavy metal compression ring 25 is provided to compress the deformable bearing ring 10 against bearing surfaces 19 and 22 of the tubular reception member 16, and 24 of the elbow member 15. It will be seen that the external surface of the compression ring 25 is a conical surface 26 which meets with the interior surface of conical portion 12 of the deformable bearing ring 10.

The compression ring 25 is assembled with the desired degree of compression against the deformable bearing ring 10 by means of a plurality of draw-down screws 27, which are aligned parallel with the axis of the tubular reception member 16 and distributed about the periphery of a circle around the axis thereof. The draw-down screws 27 are normally inserted from the underside of the axial pressure plate 24, pass through a space 28 between the upper surface of the axial pressure plate 24 and the underside of the compression ring 25 and into a threaded bore 29 extending through the compression ring 25. The direction of insertion of the draw-down screws may be reversed.

If desired, additional cushioning and certain sealing against moisture may be provided by means of a rubber disc 30 which is compressed between the axial pressure plate 24 and the compression ring 25.

The diagrammatic illustration of Figure 4 reveals features much preferred in any embodiment of the invention, and critical where substantial strength and rigidity must be insured. It will be seen that the upper conical surface 19 extends over an axial length A, which is equal or substantially greater than the change in radius, indicated by $R_1$—$R_2$, over the axial distance A. The angle of convergence actually used in the embodiments constructed was an angle of thirty (30°) degrees between the axis and the cone surface. No fixed conical angle can be specified, but it has been found that the axial distance A should be equal or substantially exceed the radial change $R_1$—$R_2$ if sufficient longitudinal strength is to be provided in the assembly illustrated.

It will be seen that the obliquity of the cone provides substantial shear strength along the axial dimension A, and the necessary radial pressure and friction over the surface 19. The obliquity also increases the friction adjustment sensitivity through the draw-down screws.

Secondly, it will be noted that the conical surface 26 of the compression ring 25 extends well below the minimum opening 21 of the shoulder 18. The "cold flow" in a radial outward direction toward the clearance 31 between axial pressure plate 24 and the end opening 17 of the tubular reception member 16, must take place under compression applied by the compression ring 26 over the axial length B, below minimum opening 21. Preferably, the compression surface 26 should extend outward to contact the deformable bearing ring 10 to a transverse plane passing through the middle portion of the outer conical surface 22. It is not necessary that compression extend exactly to the mid-point of the outer bearing surface 22, but only that it extend well outside the minimum opening 21 so as to produce the desired "cold flow" effect.

Although I have described a specific embodiment in considerable detail, it will be understood that variations can be made in the invention by those familiar with the art thereof, without departing from the spirit of the invention, and I desire that the scope of the invention be understood to include all structures which fall within the limits defined by the appended claims.

Having thus described my invention, what I claim as new and desire to secure by Letters Patent is:

1. A frictional bearing which includes a tubular reception member having an end opening for reception of a bearing member into its interior; an annular shoulder formed on the interior surface of said tubular reception member near said opening, said shoulder having a conical bearing surface converging to a minimum opening spaced interior from said end opening; a bearing ring of elastically deformable material for reception into said tubular reception member, said bearing ring having internal and external conical surfaces parallel with said converging conical bearing surface on said shoulder; a compression ring having a maximum diameter permitting its close reception internal of said minimum opening, and converging in a conical surface adapted to seat on the interior of said bearing ring; an axial pressure plate or cone for engaging the outer surface of said deformable bearing ring and compressing it against the outer surface of said annular shoulder in said reception member opening; and at least one draw down screw connecting said pressure plate to said compression ring for holding said compression ring in a position relative to said axial pressure plate to apply adjustable bearing pressure to said deformable bearing ring.

2. A frictional bearing which includes: a tubular reception member having an end opening for reception of a bearing member into its interior; an annular shoulder formed on the interior surface of said tubular reception member near said opening, said shoulder having a conical bearing surface converging to a minimum opening spaced interior from said end opening, said conical surface having an equal or substantially greater axial length than the difference in maximum and minimum radii of said surface; a bearing ring of elastically deformable material for reception into said tubular reception member, said bearing ring having internal and external conical surfaces parallel with said converging conical bearing surface on said shoulder, and said bearing ring having a separating opening along a chordal plane to permit insertion into said tubular member and flush mounting against said conical bearing surface; a compression ring having a maximum diameter permitting its close reception internal of said minimum opening, and converging to a minimum diameter external of said minimum opening; an axial pressure plate for covering said outer opening and engaging the outer surface of said deformable bearing ring against an axial bearing surface thereof; and at least one draw down screw connecting said pressure plate to said compression ring for holding said compression ring in a position relative to said axial pressure plate to apply adjustable bearing pressure to said deformable bearing ring.

3. A frictional bearing which includes: a tubular reception member having an end opening for reception of a bearing member into its interior; an annular shoulder formed on the interior surface of said tubular reception member near said opening, said shoulder having a conical bearing surface converging to a minimum opening spaced interior from said tube opening, said conical surface having an equal or substantially greater axial length than the difference in maximum and minimum radii of said surface; a bearing ring of elastically deformable material for reception into said tubular reception member, said bearing ring having internal and external conical surfaces parallel with said converging conical bearing surface on said shoulder; and an outer flange on said bearing ring, said flange having an axial thickness diminishing to a minimum clearance with increasing diameter; a compression ring having a maximum diameter permitting its close reception internal of said minimum opening, and converging to a minimum diameter external of said minimum opening; an axial pressure plate for engaging said outer flange at an outer axial bearing surface thereof; and a plurality of draw down screws connecting said pressure plate to said compression ring for holding said compression ring in a position relative to said axial pressure plate to apply adjustable bearing pressure to said deformable bearing ring.

4. A frictional bearing which includes: a tubular reception member having an end opening for reception of a bearing member into its interior; an annular shoulder formed on the interior surface of said tubular reception member near said opening, said shoulder having an inner conical bearing surface converging to a minimum opening spaced interior from said tube opening, and an outer conical bearing surface diverging from said minimum opening to said end opening, said inner conical surface having an equal or substantially greater axial length than the difference in maximum and minimum radii of said surface; a bearing ring of elastically deformable material for reception into said tubular reception member, said bearing ring having internal and external conical surfaces parallel with said converging conical bearing surface on said shoulder, and said bearing ring having a separating opening along a chordal plane to permit insertion into said tubular member and flush mounting against said conical bearing surface; an outer flange on said bearing ring having an outer bearing surface mating with said axial pressure plate and an inner bearing surface mating with said conical bearing surface; a compression ring having a maximum diameter permitting its close reception internal of said minimum opening, and converging to a minimum diameter in a plane passing through the middle portion of said outer conical bearing surface; an axial pressure plate for engaging the outer bearing surface of said outer flange; and a plurality of draw down screws connecting said pressure plate to said compression ring for holding said compression ring in a position relative to said axial pressure plate to apply adjustable bearing pressure to said deformable bearing ring.

References Cited in the file of this patent

UNITED STATES PATENTS

| | | |
|---|---|---|
| 370,774 | Fuller | Oct. 4, 1887 |
| 2,846,690 | Goodwin | Aug. 12, 1958 |

FOREIGN PATENTS

| | | |
|---|---|---|
| 572,660 | Canada | Mar. 24, 1959 |